Patented July 4, 1944

2,352,851

UNITED STATES PATENT OFFICE 2,352,851

SAPOGENIN DERIVATIVES AND
PREPARATION OF SAME

Russell Earl Marker and Harry Means Crooks, Jr.,
State College, Pa., and Eugene Leroy Wittle,
Detroit, Mich., assignors to Parke, Davis &
Company, Detroit, Mich., a corporation of
Michigan No Drawing. Application May 15, 1941,
Serial No. 393,666

20 Claims. (Cl. 260—210)

In the copending application Ser. No. 393,667, filed May 15, 1941, of Russell Earl Marker it is shown that steroidal sapogenins may be isomerized, for example, by treatment with acetic anhydride for six to fifteen hours at about 200° C., to form a new class of sapogenin derivatives designated as pseudo-sapogenins.

The pseudo-sapogenins are characterized by the fact that they contain a new type of side chain which undergoes distinctive reactions. Thus the pseudo-sapogenins are unsaturated to bromine and therefore readily decolorize a solution of bromine in acetic acid. On treatment with acids, for example, with alcoholic hydrochloric acid, the pseudo-sapogenins are isomerized to the corresponding steroidal sapogenins. The side chain of the pseudo-sapogenins contains a reactive hydroxyl group which may be acylated, for example, acetylated.

The pseudo-sapogenins can be hydrogenated, as set forth in the copending application (Serial No. 382,450, filed March 8, 1941) of Russell Earl Marker, to give another new class of compounds which may be designated as exo-dihydro-pseudo-sapogenins. In contrast to the pseudo-sapogenins, the exo-dihydro-pseudo sapogenins are not affected by alcoholic hydrochloric acid. Like the pseudo-sapogenins, however, the exo-dihydro-pseudo-sapogenins show unsaturation to bromine in acetic acid and contain in the side chain a reactive hydroxyl group which may be acylated, for example, acetylated.

It is believed that the properties of pseudo-sapogenins are best explained if the side chain attached to ring D of the cyclopentanoperhydrophenanthrene nucleus be represented by one of the following partial formulae:

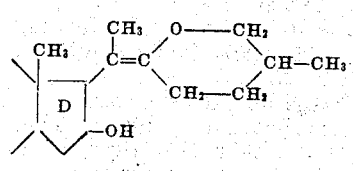

I

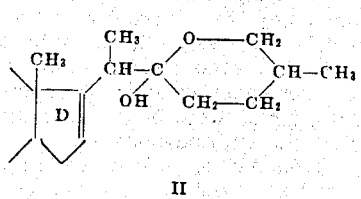

II

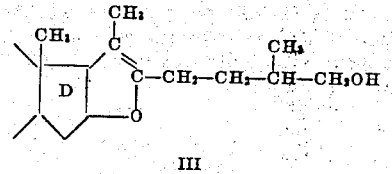

III

Of these formulae, II and III best explain the formation of the exo-dihydro-pseudo-sapogenins, and III seems to account best for the transformations described in the present invention.

It is believed that the properties of the exo-dihydro-pseudo-sapogenins are best explained if the side chain attached to the ring D of the cyclopentanoperhydrophenanthrene nucleus be represented by one of the following formulae:

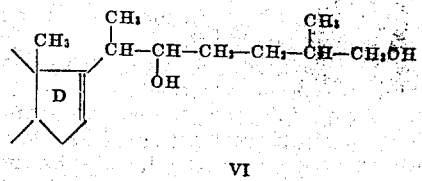

VI

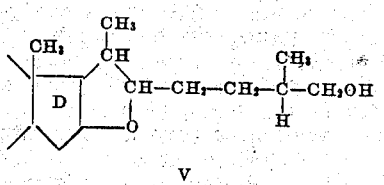

V

Of these formulae, V seems to account best for the transformations described in the present invention.

It will be observed that the partial formulae, I, II, III, IV, and V all contain a reactive hydroxyl group. This hydroxyl group may be acylated to yield compounds which may then be designated as exo-acylates.

In the case of both the terms exo-acylate and exo-dihydro-pseudo-sapogenin, the prefix exo has the same significance that it does in other branches of organic chemistry, namely, that the particular function involved is exterior to a ring system and in a position not known with greater certainty.

The present inventors have discovered that when the exo-acylates of either the pseudo-sapogenins or their exo-dihydro derivatives are oxidized under mild conditions, for example, at 20–35° C., there are obtained a new class of esters having in general the same number of carbon atoms as the pseudo-sapogenin derivatives from which they are derived. These new esters are formed in extremely high yields.

The new esters of the present invention are characterized by unique structural features in ring D; so that these esters appear to be representable by the following partial structural formula:

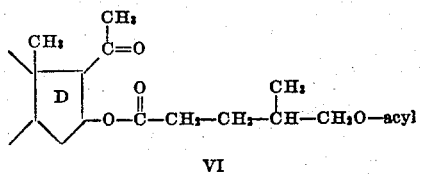

VI and these esters may therefore be designated as 20-keto-16-(δ-acyloxyisocaproöxy)-pregnane compounds.

The present inventors have also discovered that these new esters are readily hydrolyzed by treatments with acidic or alkaline agents, thereby yielding $\Delta^{16}$-20-keto-pregnene compounds representable by the following partial structural formula:

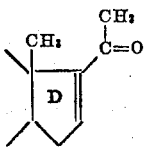

VII

Consequently, another feature of the present invention comprises subjecting the 20-keto-16-(δ-acyloxyisocaproöxy)-pregnane compounds to a definite hydrolytic step, for example, by treatment with acidic or alkaline reagents, thereby forming $\Delta^{16}$-20-keto-pregnene compounds smoothly and in high yields.

According to another feature of the present invention, the pseudo-sapogenins or their ring A and/or B glycosidic derivatives are prepared by reacting glycosidic derivatives of the sapogenins with acidic agents, for example, acylating agents such as acid anhydrides, under conditions more vigorous than those required merely for acylation.

By glycosidic derivatives of the sapogenins we means sapogenin derivatives in which sugar residues are attached through a hemi-acetal linkage to the cyclopentanoperhydrophenanthrene nucleus. In general, the exact nature of the structures of these substances are not known with certainty. The following formulae illustrate various types of the above sapogenin glycosides:

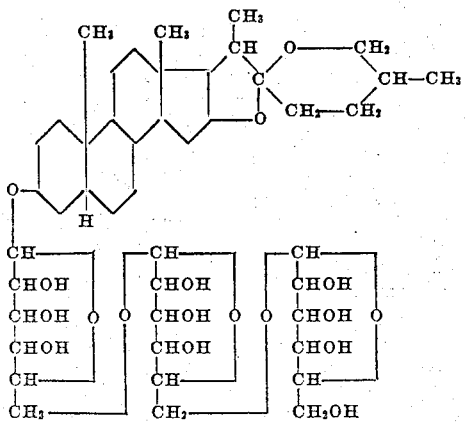

VIII. Sarsasaponin

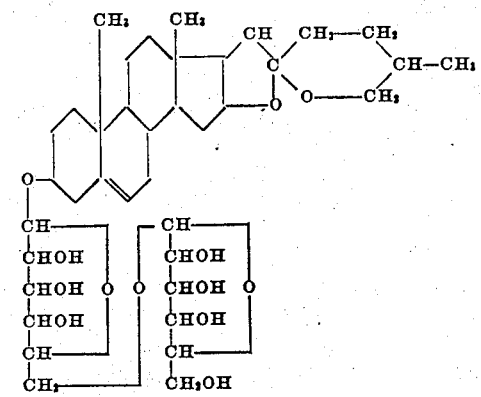

IX. Trillarin

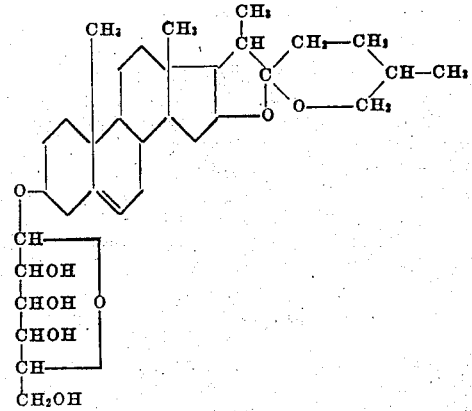

X. Trillin

Generally speaking the glycosides of the steroidal sapogenins may be classified as (1) saponins; (2) simpler glycosides. The former usually contain from three to six sugar units, all of which may be the same, or they may be different. The most commonly occurring sugar units are those of glucose, galactose, rhamnose, and xylose. The simpler glycosides differ from the saponins in that (1) they contain fewer, i. e., one to three, sugar units; (2) they are more readily obtained crystalline; (3) they do not show marked capillary active properties. In most cases, including the compounds represented by VIII, IX, and X, the exact nature of the glycosidic linkages is not definitely known; that is, it is not known whether the sugars have a furanose or pyranose structure, nor which carbon atoms of the different sugar units are (through oxygen) united. In many cases even the number and kind of sugar units present are not known.

See further, Fieser, "Chemistry of Natural Products Related to Phenanthrene," 2nd ed., p. 333 ff. (Reinhold Publishing Corporation, New York city, 1937.)

Since the steroidal sapogenins occur in nature, not in the free form, but combined with sugar units as glycosidic derivatives, the present invention makes it unnecessary to isolate the sapogenins. Instead, their more readily available glycosides may be converted directly to pseudo-sapogenin derivatives. This elimination of a formerly essential step results in higher yields of steroidal hormones from plant sources.

In a preferred form of this invention we prepare steroidal intermediates by oxidizing pseudo-diosgenin diacylates with chromic anhydride in acetic acid at 20–35° C., separating the 20-keto- 16(δ-acyloxyiso-caprooxyl)-pregnane compound thus formed and subjecting the latter to a definite hydrolysis thereby obtaining $\Delta^{16}$-pregnadienol-3-β-one-20.

Surprisingly, in the above oxidation of the pseudo-diosgenin diacylate it is not necessary to protect the $\Delta^5$ double bond. In the past where unsaturated compounds, for example, those having $\Delta^5$ double bonds, have been oxidized it has always been necessary to protect the double bond prior to oxidation as for example by adding halogen or hydrohalic acid to the double bond.

Our invention may be more fully illustrated by the following examples.

Example 1

(a) The saponins of *Trillium erectum* or from *Dioscorea villosa* may be isolated in the following manner.

The powdered rhizomes are allowed to stand for two days with sufficient alcohol to form a thin cream. This usually requires about 3 parts of alcohol per 1 part of powdered rhizome. After most of the alcohol-soluble material has been leached out in this manner, the cream is filtered and the filter cake washed well with alcohol. The alcohol solution is concentrated to a syrup and the syrup dissolved in about an equal weight or less of hot alcohol. After the solution has cooled, several volumes of ether or petroleum ether are added to cause precipitation of the crude glycoside and to dissolve the fat. The clear solution is decanted from the gummy precipitate and the latter then dissolved in alcohol and a warm alcoholic solution of a sterol such as cholesterol or sitosterol is added. After standing overnight most of the saponin has been precipitated in the form of a sterol adduct. This is collected and washed with a small amount of alcohol. After this addition compound has been air dried, it is dissolved in about 2 volumes of pyridine by warming on the steam bath for about fifteen minutes. After solution is complete about 5-10 volumes of ether is added, causing precipitation of the free saponin. This is filtered and washed with ether. It may be purified by dissolving it in alcohol or water and adding ether to reprecipitate the purified saponin. As thus obtained it is a white micro-crystalline powder fairly soluble in alcohol and water but insoluble in ether and petroleum ether. With sterols having a 3-(β)-hydroxyl group it forms insoluble adducts.

One hundred and fifty grams of the saponin from *Trillium erectum* is acetylated in the following fashion. The sponin is dissolved in 5 volumes of pyridine, and 4 volumes of acetic anhydride added. After heating on the steam bath for one hour, the mixture is poured into ether and the ethereal solution washed with water to remove pyridine and acetic acid. The ethereal layer is evaporated to leave a gummy residual acetate which after standing a few days and rubbing with a glass rod crystallizes. This product may be recrystallized from organic solvent and then has the melting point of about 146° C.

(b) One hundred and fifty grams of the above acetylated saponin is dissolved in 100 cc. of acetic anhydride and heated in a bomb tube or autoclave at 200° C. for ten hours. Then the acetic anhydride is removed under reduced pressure. This residue is the acetate of *Trillium erectum* pseudo-saponin.

(c) The above acetylated *Trillium erectum* pseudo-saponin is dissolved in 2 liters of glacial acetic acid and added at 30° C. to a stirred solution of 25 g. of chromic anhydride in 1 liter of 60% acetic acid. After the mixture has stood one and a half hours at this temperature, the excess chromic anhydride is destroyed by addition of zinc powder. The solution is filtered from excess zinc and the filtrate is concentrated in vacuo. The residue is dissolved in ether and washed with water and saturated sodium bicarbonate solution. The ethereal solution is evaporated to leave a clear yellow gummy residue weighing about 120 g. This residue consists essentially of the substance representable by the formula,

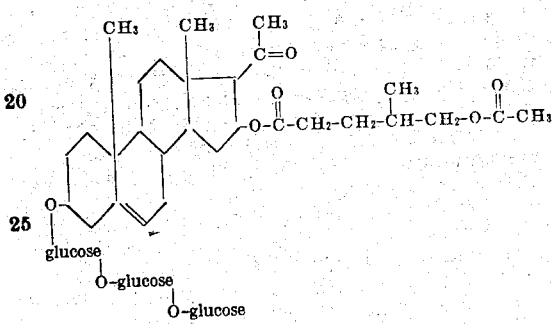

(d) The above residue is dissolved in 1½ liters of 90% alcohol and a solution of 350 g. of potassium hydroxide in an equal amount of water is added. The solution is refluxed twenty minutes during which time a gum precipitates on the sides of the flask. Then water is added to bring the alcohol concentration down to about 60%. Then enough concentrated hydrochloric acid is added to neutralize the potassium hydroxide (litmus paper test) and to give an excess of about 50 cc. of concentrated hydrochloric acid. The resulting solution is boiled three hours to complete the hydrolysis.

The solution is now thoroughly extracted with ether and the ethereal layer washed free of alcohol and acid by repeated washing with water and 5% sodium hydroxide solution. Then the ethereal solution is concentrated to leave about 15 g. of an oily residue which is impure $\Delta^{5,16}$-pregnadienol-3-(β)-one-20. It is best purified by isolating it as the acetate. To do this, the oily residue is acetylated by boiling with 2 volumes of acetic anhydride for about half an hour. Then the acetic anhydride is evaporated under reduced pressure and the residue is crystallized from methanol to yield 7-10 g. of $\Delta^{5,16}$-pregnadienol-3-(β)-one-20 acetate of melting point 174-6° C.

(e) Seven grams of the above $\Delta^{5,16}$-pregnadienol-3-(β)-one-20 acetate is dissolved in about 500 cc. of alcohol and 7 g. of a palladium-barium sulfate catalyst containing 3% by weight of palladium is added. After shaking this mixture in a hydrogen atmosphere at about 30 lbs. pressure for half an hour, the hydrogenation is essentially complete. The solution is filtered and the residue concentrated and set aside to crystallize. Thus there is obtained $\Delta^5$-pregnenol-3-(β)-one-20 acetate of melting point 149-51° C.

This may be hydrolyzed by refluxing it with 10 times its weight of 5% methanolic potassium hydroxide. The resultant solution is diluted with water and extracted with ether and the ether evaporated to leave the free hydroxy ketone. After recrystallization the $\Delta^5$-pregnenol-3-(β)- one-20 thus obtained has a melting point of 188–90° C.

(f) Two grams of Δ⁵-pregnenol-3-(β)-one-20 obtained for example as described above is heated for an hour at 200° C. with about half its weight of platinum black in an atmosphere of nitrogen. Then the mixture is dissolved in boiling ligroin and set aside to crystallize. The progesterone so obtained has a melting point of 127–8.5° C. and a biological activity of 1–2 International units per milligram.

*Example 2*

(a) A solution of 10 g. of diosgenin, 13 g. of bromacetylglucose and 5 g. of mercuric acetate in 120 cc. of dry benzene is refluxed for two hours. Then the solution is evaporated to leave an oily residue and the latter is dissolved in ether. The ethereal solution is concentrated to a small volume and chilled. The crystalline precipitate which appears is collected and triturated with ether. The crude glucoside thus obtained is recrystallized from methanol and then has a melting point of 197° C. It shows no depression in melting point when mixed with trillin acetate of melting point 199–201° C. as obtained from *Trillium erectum*. This glucoside is therefore diosgenin-α-glucoside tetraacetate.

On hydrolysis with 2% methanolic potassium hydroxide the above glucoside tetraacetate yields trillin of melting point 250° C. and giving no depression in melting point when mixed with an authentic sample isolated from *Trillium erectum*.

(b) A mixture of 5.2 g. of trillin tetraacetate and 15 cc. of acetic anhydride are heated in a bomb tube for ten hours at 200° C. The mixture then is distilled under reduced pressure to remove the acetic anhydride. The residue may be crystallized from methanol to yield pseudo-trillin acetate of melting point 165° C.

(c) To a solution of 4 g. of the pseudo-trillin acetate in 200° cc. of acetic acid cooled to 15° C. is added with stirring a solution of 1.2 g. of chromic anhydride in 20 cc. of 90% acetic acid. After the solution has stood for an hour at 25° C. water is added and the product is extracted with ether. The ethereal layer is washed well with water and 5% sodium hydroxide solution. Then the ether is evaporated to leave a crystalline residue. This is refluxed for ninety minutes with 50 cc. of alcohol containing 5 cc. of concentrated hydrochloric acid. Then the mixture is diluted with water, extracted with ether, the ethereal layer washed with water and sodium carbonate solution and then the ether removed on a steam bath. The residue is purified by treatment in the known manner with Girard's reagent and the ketone thus obtained distilled in a high vacuum at 120–140° C. The distillate is crystallized from ether, acetone, and dilute methanol and thus gives Δ⁵,¹⁶-pregnadienol-3-(β)-one-20 of melting point 210–212° C.

This may be converted to progesterone, for example, according to the method described in the previous example.

*Example 3*

(a) A mixture of 5 g. of diosgenin and 25 cc. of acetic anhydride is heated in a bomb tube at 195–200° C. for an hour. Then the acetic anhydride is evaporated in vacuo to leave a residue which crystallizes after cooling. This residue may be recrystallized from methanol and then has a melting point of 97–101° C. It is pseudo-diosgenin diacetate.

Instead of using acetic anhydride in this step the diosgenin may be heated to 200° C. for six to fifteen hours with propionic anhydride, butyric anhydride, valeric anhydride or any other carboxylic acid anhydride. However, the yields are best with the lower aliphatic mono-carboxylic acid anhydrides.

(b) To a solution of 10 g. of pseudo-diosgenin diacetate in 200 cc. of glacial acetic acid cooled to 15° C. is added a solution of 7 g. of chromic anhydride in 7 cc. of water and 20 cc. of acetic acid. The temperature rapidly rises to 28° C. and is maintained at that point for forty-five minutes. Then water is added and the product extracted with ether. The ethereal solution is washed well with water and sodium bicarbonate solution and then evaporated. The residue is crystallized from diluted or undiluted methanol to give a product having the empirical formula $C_{31}H_{46}O_7$ and a melting point of 84–86° C. The compound is not pseudo-diosgenin diacetate, since it depresses in melting point with the latter to 76–80° C. The compound is believed to have the structure

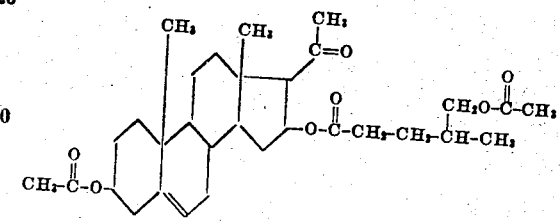

(c) Three hundred milligrams of the above oxidation product is refluxed in 20 cc. of alcohol with 300 mgs. of potassium hydroxide for thirty minutes. Then water is added and the organic material removed with ether. The ethereal layer is washed with water and then the solvent is removed to leave a residue which may be crystallized from acetone and from ethyl acetate. The product thus obtained is Δ⁵,¹⁶-pregnadienol-3-(β)-one-20 of melting point 213–215° C. It does not depress in melting point when mixed with an authentic sample.

The same Δ⁵,¹⁶-pregnadienol-3-(β)-one-20 may be obtained when the oxidation product above is refluxed with 10% alcoholic hydrochloric acid or with alcoholic potassium carbonate solution. In each case the yield is practically theoretical.

The new oxidation product prepared as described in part b of this example may be called Δ⁵-pregnenediol-3-(β)-16-one-20 3-acetate 16-(δ-acetoxy-)-isocaproate. If an acid anhydride other than acetic anhydride is used in part a of this example there are formed correspondingly other esters of pseudo-diosgenin, for example, the use of butyric anhydride leads to the formation of pseudo-diosgenin dibutyrate. These esters may be oxidized as in part b to give analogous compounds, for example, pseudo-diosgenin dibutyrate thus gives a compound which may be designated as Δ⁵-pregnenediol-3-(β)-16-one-20 3 - butyrate-16-(δ-butyroxy)-isocaproate.

*Example 4*

(a) To a solution of 1 g. of pseudo-diosgenin in 100 cc. of glacial acetic acid is added 500 mgs. platinum oxide catalyst. Then the mixture is shaken in an atmosphere of hydrogen at 45 lbs. pressure for fifteen hours at about room temperature. At the end of this time the solution is filtered and the filtrate concentrated to a volume of about 10 cc. Upon chilling, a crystal crop appears which may be collected and recrystallized from acetic acid and from ether to give tetrahydro-pseudo-diosgenin of melting point 202–205° C. Mixed melting point determinations show that it is different from tigogenin and from pseudo-diosgenin.

It can be recovered unchanged after boiling with alcoholic hydrochloric acid for two hours. This compound differs from diosgenin in having two additional hydrogens in the side chain and in having the nuclear double bond at $\Delta^5$-saturated. The compound is therefore identical with dihydro-pseudo-tigogenin.

The same compound, tetrahydro-pseudo-diosgenin, may also be prepared by hydrogenating pseudo-tigogenin.

(b) To a solution of 5 g. of the above tetrahydro-pseudo-diosgenin is added about 20 cc. of acetic anhydride. The mixture is refluxed for about a half hour and then the acetic anhydride is removed under reduced pressure. The residue is the diacetate of tetrahydro-pseudo-diosgenin. After recrystallization from methanol, this diacetate has M. P. 122–124° C.

The whole of the above diacetate is dissolved in 200 cc. of glacial acetic acid and a solution of 4 g. chromic anhydride in 20 cc. of 80% acetic acid is run in while keeping the temperature below 30° C. After the mixture has stood at 40° C. for about two hours, water is added and the mixture extracted with ether. The ethereal layer is washed free of acetic acid with water and then the ether is removed on a steam bath. The residue may be crystallized from dilute methanol and finally from methanol to give the oxidation product of melting point 102–104° C. This compound is believed to have the following formula,

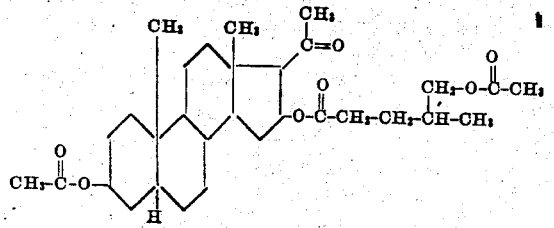

and it may be designated as allo-pregnanediol-3-($\beta$)-16-one-20 3-acetate 16-($\delta$-acetoxy)-isocaproate.

The same compound may be obtained by oxidizing pseudo-tigogenin diacetate in a similar manner.

(c) A solution of 500 mgs. of the above oxidation product (allo-pregnanediol-3-($\beta$)-16-one-20 3-acetate 16-($\delta$-acetoxy)-isocaproate) in 50 cc. of 2% alcoholic potassium hydroxide is refluxed for thirty minutes. Then water is added and the mixture extracted with ether. The ethereal layer is washed with water and the ether removed on a steam bath. The residue is crystallized from dilute methanol and thus yields $\Delta^{16}$-allo-pregnenol-3-($\beta$)-one-20 of melting point 202–204° C. It does not depress melting point when mixed with an authentic sample.

Instead of using alcoholic potassium hydroxide in this hydrolysis, there may be used alcoholic hydrochloric acid or alcoholic potassium carbonate or other alkaline or acidic agents. The reaction proceeds well even under mild conditions, e. g., with hot sodium bicarbonate solution.

*Example 5*

(a) A mixture of 10 g. of sarsasapogenin, 13 g. of bromoacetyl glucose and 5 g. of mercuric acetate in 120 cc. of dry benzene is refluxed for two hours. The solution is evaporated in vacuo and the residue dissolved in ether. The ethereal solution is concentrated to a small volume and chilled. The crystalline material which separates is collected, triturated with ether and recrystallized from alcohol to give sarsasapogenin-$\alpha$-glucoside tetraacetate of M. P. 227° C.

The above tetraacetyl glucoside may be hydrolyzed by letting it stand overnight with 2% methanolic potassium hydroxide solution. Thus there is obtained sarsasapogenin-$\alpha$-glucoside of M. P. 245° C.

(b) Five grams of sarsasapogenin-$\alpha$-glucoside tetraacetate and 20 cc. of acetic anhydride are heated in a bomb tube for eight hours at 200° C. Then the acetic anhydride is removed in vacuo to leave a residue of pseudo-sarsasapogenin-$\alpha$-glucoside penta-acetate. This substance may be represented by the following structural formula,

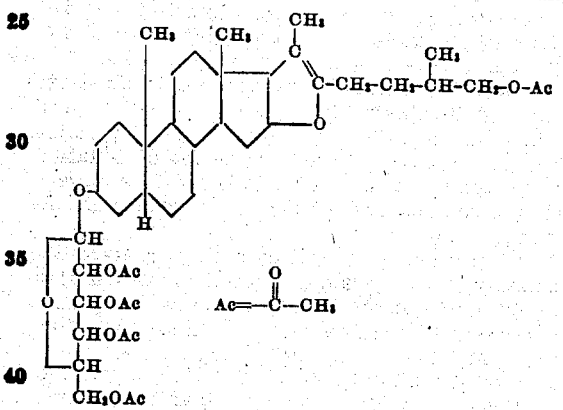

*Example 6*

(a) A mixture of 8 g. of sarsasapogenin acetate and 30 cc. of acetic anhydride is heated in a bomb tube at 195–200° C. for ten hours. The acetic anhydride is then evaporated in vacuo and the residual syrup hydrolyzed with alcoholic potassium hydroxide. The alkaline solution is diluted with water and the precipitated solid taken up in ether. The ether is evaporated to a small volume and the white crystals collected, washed with ether, and recrystallized from ethyl acetate to give white needles, M. P. 171–173° C.

This product, which is pseudo-sarsasapogenin, forms a crystalline di-p-nitrobenzoate which may be crystallized from acetone as pale yellow crystals, M. P. 156.5–159° C. Pseudo-sarsasapogenin diacetate as commonly prepared, for example, by refluxing with acetic anhydride, is an oil which may be crystallized only with difficulty.

(b) Pseudo-sarsasapogenin diacetate is prepared by refluxing 10 g. of pseudo-sarsasapogenin for thirty minutes with 60 cc. of acetic anhydride and then removing the excess acetic anhydride by evaporation in vacuo.

(c) To a solution of 10 g. of the above pseudo-sarsasapogenin diacetate in 200 cc. of glacial acetic acid cooled to 150° C. is added slowly a solution of 7 g. of chromic anhydride in 30 cc. of 80% acetic acid over a period of forty-five minutes while maintaining the temperature at approximately 28° C. Then the mixture is diluted with water and extracted with ether. The ethereal solution is thoroughly washed with water to remove acetic acid. Finally, the solution is carefully washed with sodium bicarbonate solution and again with water. The ether is removed on a steam bath to leave a residue of pregnanediol-3-(β)-16-one-20 3-acetate-16-(δ-acetoxy) isocaproate. As usually obtained, it is an oil which may be crystallized only with great difficulty. It may be represented by the following structural formula,

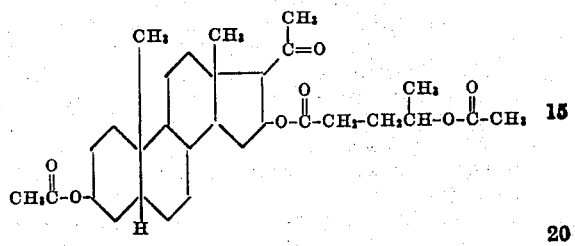

(d) When the above pregnanediol-3-(β)-16-one-20 3-acetate-16-(δ-acetoxy) isocaproate is hydrolyzed, for instance, according to the directions of Example 4 (c), there is obtained $\Delta^{16}$-pregnene-ol-3-(β)-one-20.

The above examples are intended to illustrate but not to limit the present invention and numerous variations in regard to starting materials, conditions of reaction, modes of isolation of the product and other details will be apparent to those skilled in the art after a perusal of this specification.

For example, as naturally occurring glycosidic derivatives of steroidal sapogenins which may be used in the practice of this invention there may be mentioned amolonin, sarsasaponin, digitonin, or like steroidal saponins. Also, there may be used partially degraded glycosidic derivatives of these saponins, such as trillarin or trillin. Such partially degraded glycosidic derivatives of saponins are obtained by hydrolyzing the saponin at some of the oligosacharide linkages by means of enzymes or dilute acids or similar reagents. Again, there may be used synthetic glycosidic derivatives of steroidal sapogenins such as the synthetic galactosides, glucosides, ribosides, and other glycosides of sapogenins such as sarsasapogenin, diosgenin, or other steroidal sapogenins containing reactive nuclear hydroxyl groups. Synthetic glycosides suitable for the practice of this invention may also be prepared from sapogenins which have reactive nuclear hydroxyl groups, but which are not aglycones of naturally occurring saponins. For example, although neither epi-sarsasapogenins nor its glycosides occur in nature, glycosides of epi-sarsasapogenin may be prepared synthetically from sarsasaponin by converting the latter into its aglycone, sarsasapogenin, and then converting this into epi-sarsasapogenin. The epi-sarsasapogenin may then be treated to form the glycoside as for example by treatment with bromoacetoglucose.

The conversion of the glycosidic derivative of the steroidal sapogenin into an acylated glycosidic pseudo-sapogenin may be effected by treating the former with an acylating agent under conditions more vigorous than those required for mere acylation. This step may be effected, for example, by treatment of the glycosidic derivatives of the sapogenins with a carboxylic anhydride at 175–250° C. We have found that best results are obtained with lower fatty acid anhydrides while maintaining the reaction temperature in the neighborhood of 200° C. The product thus formed is an acylated glycosidic pseudo-sapogenin derivative acylated at least at the exo-hydroxyl group and in the sugar residues. This product may be converted into the new esters of the present invention according to several ways.

The acylated glycosidic pseudo-sapogenin derivatives may be mildly oxidized in the side chain attached to ring D with production of an acylated glycosidic derivative of a steroid having in ring D the structure

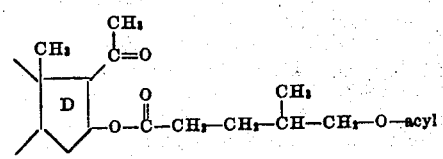

In this case the remainder of the steroid molecule containing the acylated sugar residues remain substantially unaffected during the oxidation and the product may then be hydrolyzed with production of a steroid having in ring D the structure

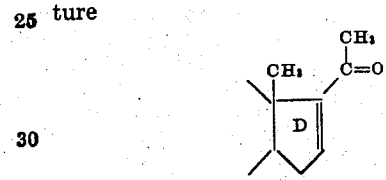

The above hydrolysis acts both upon the δ-acyloxy-isocaprooxy group attached to C-16 and the acylated sugar residues in the other portions of the steroid nucleus. Certain rules can be set down with regard to the products formed during this hydrolysis. The δ-acyloxy-isocaprooxy group at C-16 is hydrolytically removed with production of a steroid having in ring D the structure

under conditions of very mild hydrolysis, as for example by treatment with dilute acidic or alkaline reagents. For instance, this group is removed by warming the steroid with dilute alcoholic hydrochloric acid, dilute sodium carbonate solution or dilute barium hydroxide solution. On the other hand, the acylated sugar residues in the remainder of the molecule are affected differently, depending on whether the conditions of hydrolysis are alkaline or acidic. Mild alkaline hydrolysis removes only the acyl groups attached to the sugar residue, while leaving the sugar residues still attached to the steroid nucleus. However, acid hydrolysis removes the sugar residues as well, thereby leaving hydroxyl groups in the steroid nucleus at the position to which the sugar residues were formerly attached. Suitable alkaline reagents for removal of the acyl groups from the sugar residues, while leaving the unacylated sugar residues thus formed still attached to the steroid nucleus, include cold sodium methylate solution, barium hydroxide solution, calcium hydroxide solution and cold sodium hydroxide solution. The acidic hydrolysis required to remove the sugar residues from the steroid nucleus is best achieved by boiling the substance with alcoholic hydrochloric acid. However, other acidic reagents such as dilute sulfuric acid, or other mineral acids may be used instead.

Instead of directly oxidizing the acylated glycosidic pseudo-sapogenin derivative, it may first be catalytically hydrogenated in the side chain attached to ring D, with production of a glycosidic derivative of an exo-dihydro-pseudo-sapogenin acylated at least at the exo-hydroxyl group and in the sugar residue. This catalytic hydrogenation is accomplished by shaking the glycosidic derivative in an atmosphere of hydrogen in the presence of a catalyst such as platinum, Raney nickel or one of the metallic oxide catalysts such as copper chromite. Since the glycosidic derivatives are solids, best results are achieved by hydrogenating them in solution using such a solvent as acetic acid, ethyl alcohol, ethyl acetate or similar organic solvents inert to catalytic hydrogenation under the conditions employed.

The acylated glycosidic exo-dihydro-pseudo-sapogenin derivatives produced in the above hydrogenation may then be mildly oxidized in the side chain attached to ring D with production of an acylated glycosidic derivative of a steroid having in ring D the structure

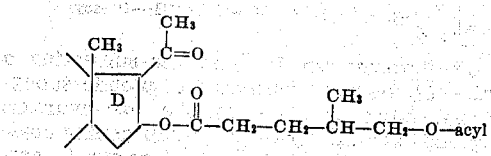

and the latter treated as described in the earlier paragraphs.

According to still another alternative procedure the acylated glycosidic pseudo-sapogenin derivatives may be hydrolyzed with alkaline reagents with production of a glycosidic derivative of a pseudo-sapogenin unacylated at least at the exo-hydroxyl group and in the sugar residues. This product may then be mildly oxidized in the side chain attached to ring D and the oxidation product subjected to hydrolysis with an acidic reagent with production of a steroid having in ring D the structure

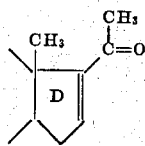

and having in the remainder of the steroid skeleton hydroxyl groups in place of the sugar residue.

The step of oxidation referred to in the above description is best accomplished under relatively mild conditions. We have found that best results are obtained if the pseudo-sapogenin derivatives are oxidized below 50° C. by means of an oxidizing agent of the class consisting of chromic and permanganic acids and their salts. However, other oxidizing agents such as ozone, hydrogen peroxide, and the like may effectively be employed in this step. Particularly satisfactory results are obtained when the oxidation is conducted at 20–35° C. in acetic acid, using chromic anhydride as the oxidant.

It will be appreciated that the present invention also comprehends a new and useful class of steroidal esters. These are steroidal compounds characterized by containing in ring D of the steroid skeleton the structural features representable by the formula

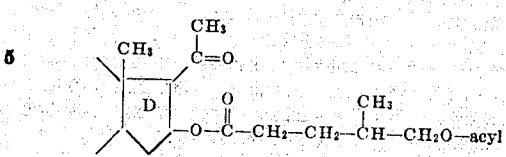

and containing in the remainder of the steroid skeleton only such groups as are unaffected by mild oxidation. These steroidal compounds have great utility in the preparation of steroidal hormones since they are readily hydrolyzed with production of steroidal compounds having in ring D the structure

which can in turn be readily converted into hormones having androgenic, progestational, or cortical activity.

A particularly useful group of steroidal compounds falling within the scope of the present invention are those representable by the formulae

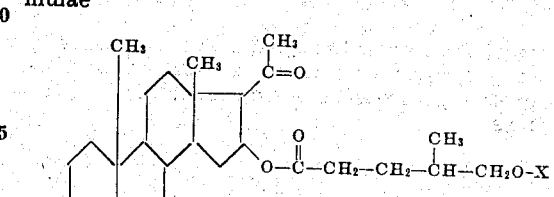

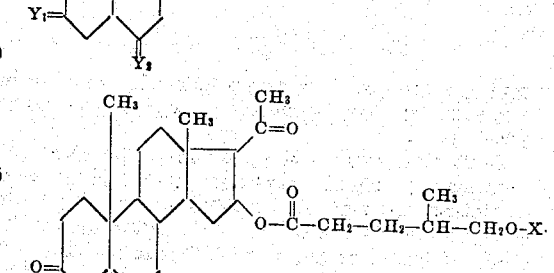

and

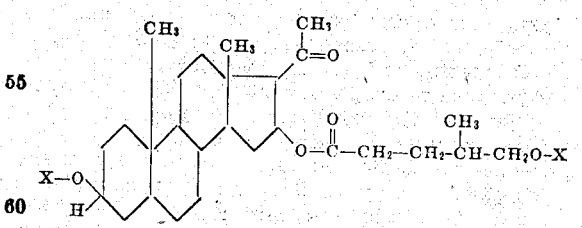

where $Y_1$ is a member of the class consisting of

and (=O); $Y_2$ is a member of the class consisting of $Y_1$ and

and where X is the acyl radical of a lower fatty acid. These substances are readily derived from the easily available naturally occurring saponins such as sarsasapogenin, dioscorea-saponin, amolonin and similar naturally occurring steroidal saponins.

While we have described and illustrated certain forms of our invention and have set these forth in terms of a particular theory, we wish it to be understood that our invention is not to be limited to these forms, nor is its operability in any way affected by the ultimate correctness of the particular theory herein employed.

What we claim as our invention is:

1. The process for the preparation of steroidal compounds which comprises isomerizing and acylating the side chain attached to ring D of a glycosidic derivative of a steroidal sapogenin by reacting said glycosidic derivative with an acylating agent under conditions more vigorous than those required for mere acylation, with production of a glycosidic derivative of a pseudo-sapogenin acylated at least at the exo-hydroxyl group and in the sugar residues, oxidizing said acylated glycosidic pseudo-sapogenin derivative in the side chain attached to ring D at a temperature not substantially above 50° C., with production of an acylated glycosidic derivative of a steroid having in ring D the structure

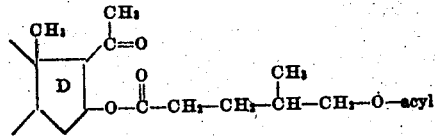

and subjecting said acylated glycosidic derivative to hydrolysis with an acidic reagent, with production of a steroid having in ring D the structure

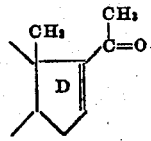

and having, in the remainder of the steroid skeleton, hydroxyl groups in place of the sugar residues.

2. The process for the preparation of steroidal compounds which comprises isomerizing and acylating the side chain attached to ring D of a glycosidic derivative of a steroidal sapogenin selected from the class consisting of sarsasapogenin, chlorogenin and diosgenin, by reacting said glycosidic derivative with a carboxylic acid anhydride at 175–250° C., with production of a glycosidic derivative of a member of the class consisting of pseudo-sarsasapogenin, pseudo-chlorogenin, and pseudo-diosgenin, said glycosidic pseudo-sapogenin derivative being acylated at least at the exo-hydroxyl group and in the sugar residues, oxidizing said acylated glycosidic pseudo-sapogenin derivative in the side chain attached to ring D, by treating said acylated glycosidic pseudo-sapogenin derivative below 50° C. with an oxidizing agent of the class consisting of chromic and permanganic acids and their salts, with production of an acylated glycosidic derivative of a steroid having in ring D the structure

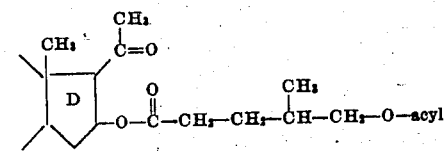

and subjecting said acylated glycosidic derivative to hydrolysis with an acidic agent, with production of a steroid having in ring D the structure

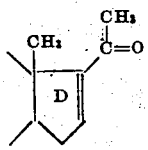

and having, in the remainder of the steroid skeleton, hydroxyl groups in place of the sugar residues.

3. The process which comprises subjecting a member of the class consisting of glycosidic derivatives of pseudo-sapogenins acylated at least at the exo-hydroxyl group and in the sugar residues and glycosidic derivatives of exo-dihydro-pseudo-sapogenins acylated at least at the exo-hydroxyl group and in the sugar residues, to oxidation in the side chain attached to ring D at a temperature not substantially above 50° C., with production of an acylated glycosidic derivative of a steroid having in ring D the structure

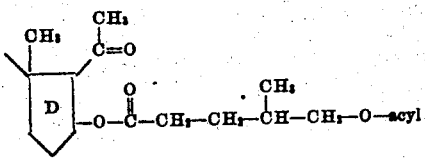

4. The process which comprises subjecting a member of the class consisting of pseudo-sapogenins acylated at least at the exo-hydroxyl group, and exo-dihydro-pseudo-sapogenins acylated at least at the exo-hydroxyl group, to oxidation in the side chain attached to ring D at a temperature not substantially above 50° C., with production of a steroid having in ring D the structure

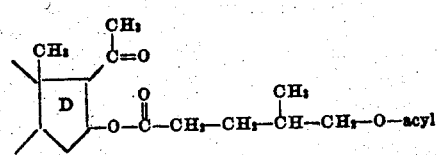

5. The process which comprises subjecting a pseudo-sapogenin compound representable by the formula

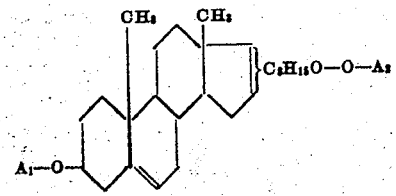

where $A_1$ is a member of the class consisting of acyl radicals and acylated sugar residues, and $A_2$ is an acyl radical, to oxidation in the side chain attached to ring D at a temperature not substantially above 50° C. without protection of the $\Delta^5$-double bond, with production of a steroid representable by the formula,

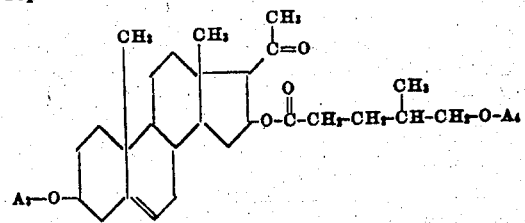

where $A_3$ is a member of the class consisting of acyl radicals and acylated sugar residues, and A4 is an acyl radical.

6. The process which comprises oxidizing below 50° C. a member of the class consisting of glycosidic derivatives of pseudo-sapogenins acylated at least at the exo-hydroxyl group and in the sugar residues and glycosidic derivatives of exo-dihydro-pseudo-sapogenins acylated at least at the exo-hydroxyl group and in the sugar residues, by means of an oxidizing agent of the class consisting of chromic and permanganic acids and their salts, with production of an acylated glycosidic derivative of a steriod having in ring D the structure

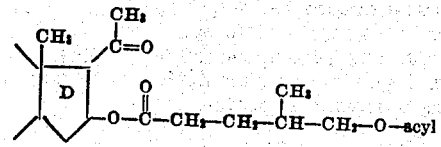

7. The process which comprises oxidizing below 50° C. a member of the class consisting of pseudo-sapogenins acylated at least at the exo-hydroxyl group, and exo-dihydro-pseudo-sapogenins acylated at least at the exo-hydoxyl group, by means of an oxidizing agent of the class consisting of chromic and permanganic acids and their salts, with production of a steriod having in ring D the structure

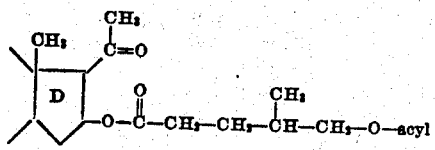

8. The process which comprises oxidizing below 50° C. a pseudo-sapogenin compound representable by the formula

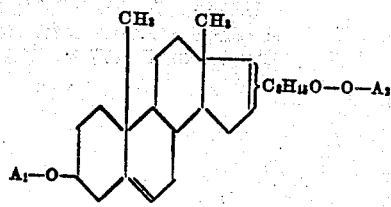

where $A_1$ is a member of the class consisting of acyl radicals and acylated sugar residues, and $A_2$ is an acyl radical, by means of an oxidizing agent of the class consisting of chromic and permanganic acids and their salts, with production of a steriod representable by the formula,

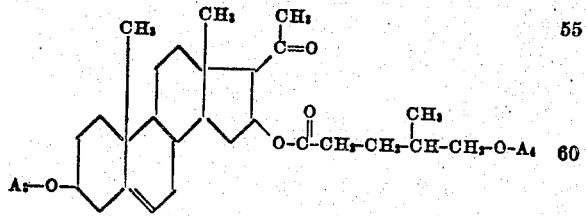

where $A_3$ is a member of the class consisting of acyl radicals and acylated sugar residues, and $A_4$ is an acyl radical.

9. The process which comprises hydrolyzing a steriod having in ring D the structure

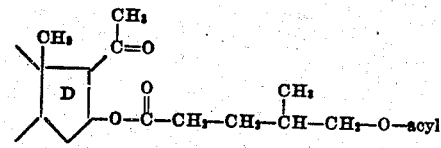

by treating said steriod with a reagent selected from the class consisting of alkaline agents and acidic agents, with production of a steriod having in ring D the structure

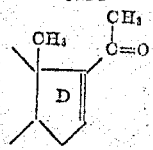

10. A steroidal compound characterized by containing in ring D of the steriod skeleton the structural features represented by the formula

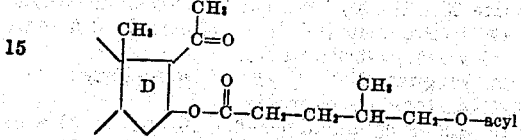

and containing in the remainder of the steriod skeleton only such groups as are unaffected by mild oxidation.

11. A steroidal compound represented by one of the class consisting of the formulae

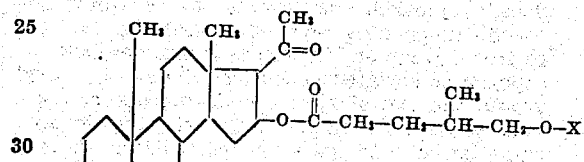

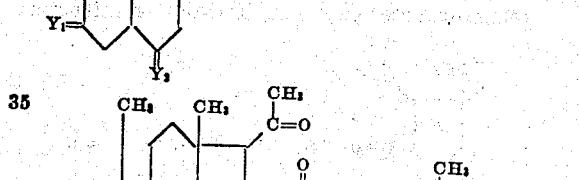

and

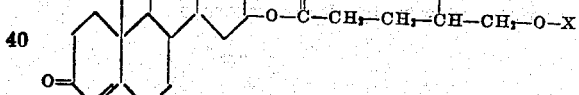

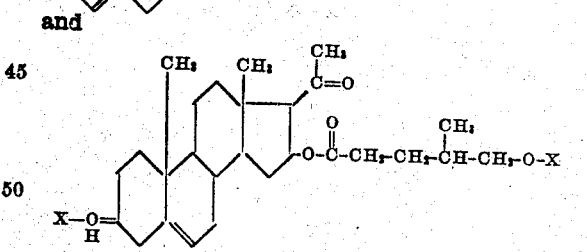

where $Y_1$ is a member of the class consisting of

and (=O); $Y_2$ is a member of the class consisting of $Y_1$ and

and where X is the acyl radical of a lower fatty acid.

12. A compound represented by the formula,

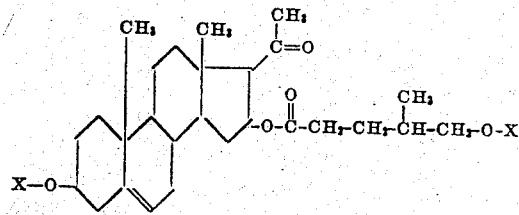

where X is the acyl radical of a lower fatty acid.

13. A compound represented by the formula,

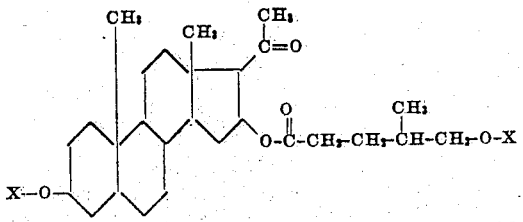

where X is the acyl radical of a lower fatty acid.

14. Δ⁵-Pregnenediol-3-(β)-16-one-20 3-acetate 16-(δ-acetoxy)-isocaproate.

15. Pregnanediol-3-(β)-16-one-20 3-acetate 16-(δ-acetoxy)-isocaproate.

16. allo-Pregnanediol-3-(β)-16-one-20 3-acetate 16-(δ-acetoxy)-isocaproate.

17. The process which comprises subjecting a member of the class consisting of glycosidic derivatives of pseudo-sapogenins acylated at least at the exo-hydroxyl group and in the sugar residues, glycosidic derivatives of exo-dihydro-pseudo-sapogenins acylated at least at the exo-hydroxyl group and in the sugar residues, pseudo-sapogenins acylated at least at the exo-hydroxyl group, and exo-dihydro-pseudo-sapogenins acylated at least at the exo-hydroxyl group to mild oxidation at a temperature below 50° C. thereby producing a steroid having in ring D the structure

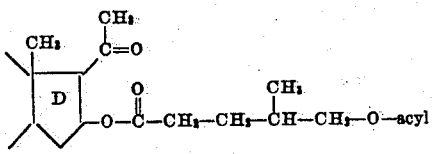

and having in ring A the structure

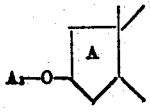

where $A_3$ is a member of the class consisting of acyl radicals and acylated sugar residues.

18. The process which comprises subjecting a pseudo-diosgenin diacylate to mild oxidation at a temperature below 50° C. thereby forming a Δ⁵-pregnenediol-3-β-one-20-3-acyl-16-(δ-acyloxy)-isocaproate compound and hydrolyzing the latter to obtain Δ¹⁶-pregnadienol-3-β-one-20.

19. The process which comprises subjecting pseudo-diosgenin diacetate to mild oxidation at a temperature below 50° C. thereby forming Δ⁵-pregnenediol-3-β-one-20-3-acetate-16-(δ-acetoxy)-isocaproate compound and hydrolyzing the latter to obtain Δ¹⁶-pregnadienol-3-β-one-20.

20. The process which comprises hydrolyzing an acylated glycosidic derivative of a steroid having in ring D the structure

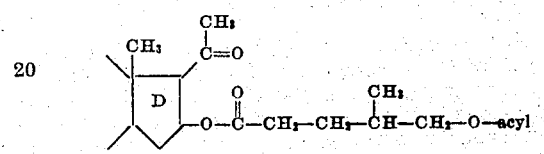

by treating said acylated glycosidic derivative with an acidic agent, with production of a steroid having in ring D the structure

and having, in the remainder of the steroid skeleton, hydroxyl groups in place of the sugar residues.

RUSSELL EARL MARKER.
HARRY MEANS CROOKS, Jr.
EUGENE LEROY WITTLE.